United States Patent [19]

Schedewie

[11] 3,764,218

[45] Oct. 9, 1973

[54] LIGHT BEAM EDGE DETECTION

[75] Inventor: Franz Joseph Schedewie, Boeblingen, Germany

[73] Assignee: International Business Machines Corporation, Armonk, N.Y.

[22] Filed: Jan. 12, 1972

[21] Appl. No.: 217,170

[30] Foreign Application Priority Data

Jan. 16, 1971  Germany................... P 21 02 027.9

[52] U.S. Cl.................. 356/118, 350/150, 350/157, 356/152, 356/153, 250/219 DR
[51] Int. Cl. .......................................... G01n 21/40
[58] Field of Search ............ 356/114–119, 152, 153; 350/150, 157; 250/219 DR

[56] References Cited
UNITED STATES PATENTS

3,591,254  6/1971  Browne et al........................ 350/150
3,391,970  6/1968  Sincerbox ........................... 356/114

*Primary Examiner*—Ronald L. Wibert
*Assistant Examiner*—Paul K. Godwin
*Attorney*—Henry Powers et al.

[57] ABSTRACT

A light beam polarized at 45° to the plane of view is split in a birefringent crystal into two components, o and ao, which are linearly polarized vertically and parallel to the plane of view respectively. An electro-optic element energized by a High Frequency source transforms the components into two oppositely circularly polarized beams so as to alternately change their direction of polarization by 90°. The alternately polarized beams are simultaneously passed through a second birefringent crystal so as to converge one beam to the other beam at a single exit site of the crystal, and in the other configuration of rotated polarization, so as to diverge the other beam so that the two beams exit at two spaced sites of the crystal spaced about the first exit site. This alternately provides a single central beam and two outer beams. When an edge separating a surface having areas of two different optical properties is brought into the range of the alternating light beams, the change in their intensities is employed to precisely locate the edge by the rate of change in intensities.

36 Claims, 13 Drawing Figures

RATE OF CHANGE OF INTENSITY

LIGHT BEAM EDGE DETECTION

BACKGROUND OF THE INVENTION

1. Field of the Invention

This invention relates to optical beam deflection and orientation, and more particularly to optical detection of an edge demarcating areas of varying optical properties.

2. Description of the Prior Art

Heretofore, the existence of predetermined gradients of reflectivity or transparency of a surface could be determined by scanning the surface by means of light beams with the reflected or the transmitted light transduced by photosensitive elements into electrical signals, which, after appropriate processing by suitable electrical circuits locate the edge between the varying optical properties of the surface. The scanning is normally accomplished by detecting the existence of disturbances resulting from imaging of a light probe at the absolute or relative position of line edges, particularly their spacings, or across the form of an alpha-numeric character to be detected. It is also possible to use light beam scanning for evaluation of images with different transitions of transparencies, reflectants, color properties, shadows, for evaluation of optical gradient in transition of transparencies or reflectancies, or opacities or of color properties, and the like.

In all these forms of application, the light beam only serves as a probe whose modulation, on scanning, is transduced into electrical signals which are processed into required results by well-known circuit techniques.

Typical of such prior arts system is that described in "Automatisches Vermessen und Protokollieren von Praezisionsmabstaeben" by K. Heinecke, Maschinemarkt, 71, May 1965 page 27, which utilizes a scanning light beam for analysis of a transparency wherein the light beam impinges upon the edge of a prism through which the resultant signal is split into equal components. The difference in the components is then determined by two photo cells followed by a comparison of their output currents.

In the same article, other scanning techniques with oscillating slits and with perforated discs are also described. In such techniques, the reflected or transmitted light only serves as source signals which are transduced into electrical pulses, which after processing by conventional electrical techniques, are processed into the desired information of the scanned surface. Typical circuits for processing the photo-electric signal can comprise bridges and differentiating circuits for carrying out zero tuning of threshold value circuits for determining maximum or minimum values, or of time measuring circuits for measuring pulse widths or pulse spacings.

These prior processes are characterized with various disadvantages by which errors can result as for example, by aging of the photo-electric cells, which particularly in connection with zero tuning processes, can create considerable error in the results obtained. Additionally, such systems are characterized with delays in operation and tolerances in the result which have been a deterent for their use in various applications.

SUMMARY OF THE INVENTION

It is, accordingly, an object of this invention to provide a measurement system where the processing of information in the form of light values is performed optically in the initial stage so as to provide optical control signals which may then be transduced into electrical control signals.

In accordance with this invention, this is accomplished by a method and system for optical tuning with light spot scanner, particularly for indicating edge finding in connection with measuring microscopes, characterized in that the surface to be evaluated is scanned by alternate illumination of two configurations of light beams, semiadditive in nature, which on modulation by the surface result in a change of intensities which when transcribed provide information of the reflectivity or transparency of the surface.

Another object of this invention is characterized in that the ratio of the varying optical properties of the surface and of the light intensities, are correlated to each other in such a manner that the difference of the reflected and/or transmitted light beams disappears upon periodic alternating illumination of the surface to provide information with respect thereto.

A further object of this invention is characterized in that the surface under examination is iluminated by an alternating configuration of light beams symmetrically imaged on the surface with respect to each other. A further object of this invention is characterized by an optical edge detection system for detecting an edge separating areas of varying optical properties on a surface.

A further object of this invention is characterized by a light deflection system in which a single light beam source is modified into two different light beam configurations wherein in the first configuration two spaced light beams are developed whereas in the second configuration, the two light beams are combined into a single beam intermediate the spacing of the initial pair of beams. A still further object of this invention is characterized by an edge detection system in which an alternate configuration light beam is modulated by a scanned surface to provide information as to change in intensities whereby the maximum change in intensities provides an indication of a gradient in the optical properties of the scanned surface.

It is also an object of this invention to provide an edge detection system characterized by symmetrical illumination of the surface with an alternate configuration of light beams for detection of an edge of varying optical properties (e.g. opaque and transparent) to result in modulation of the light beams to represent a change in intensities thereof in the form of a sine wave in which the maximum change in intensities indicates the location of the edge dividing the optical properties of the surface.

The foregoing and other objects, features and advantages of the present invention will be apparent from the following more particular description of the preferred embodiments of the invention as illustrated in the accompanying drawings.

DESCRIPTION OF THE PREFERRED EMBODIMENT

Figure 1:
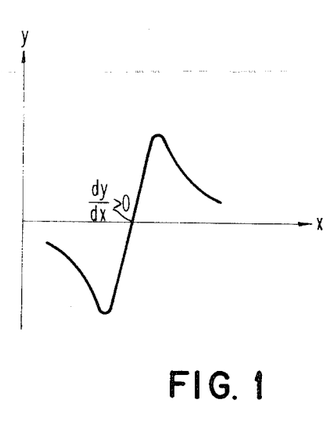
FIGS. 1 and 1A are drawings illustrating signal curves obtained in known optical tuning processes.
Figure 1A:
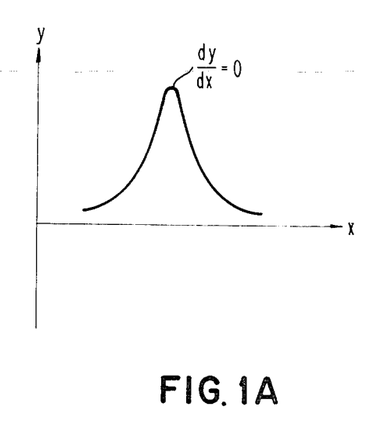

It is known from photometry that the tuning of the brightness of the luminescent surface and of the comparison surface at the same brightness can be performed with far greater precision than the tuning of a luminescent surface for brighteness maximum or minimum. It is also known, from he field, measuring fied, that a frequency can be measured more exactly by overlapping with a comparison frequency and tuning to a beat frequency zero, than by resonance tuning with a oscillating circuit. The reason for these differences in precision is shown in FIGS. 1 and 1A. In a zero tuning process, ccording to FIG. 1, a measuring signal $y$ shows its highest gradient at the position of the zero crossing, so that the zero tuning can be carried out with optimum sensitivity. However, as seen from the single curve $y$ shown in FIG. 1A, tuning for maximum or minimum, is independent, or substantially independent, of the variable $x$. This has the effect of a relatively high measuring error, independent of whether the tuning is done manually or automatically.

In known measuring microscopes, the beam probe for determing the occurrence of an edge, is oscillated by suitable means so that the second derivative (as a function of the position coordinate) disappears at the location of the highest ingredient of the reflection or transmission. Here, the second derivative is formed electronically, which, specified above is characterized by several disadvantages.

Figure 2:
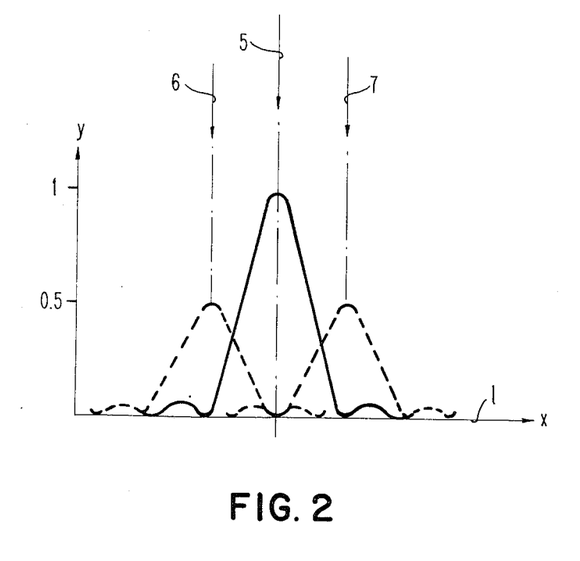
FIG. 2 is a schematic drawing illustrating the optical intensity of alternate illumination by two configurations of light beams.
Figure 3:
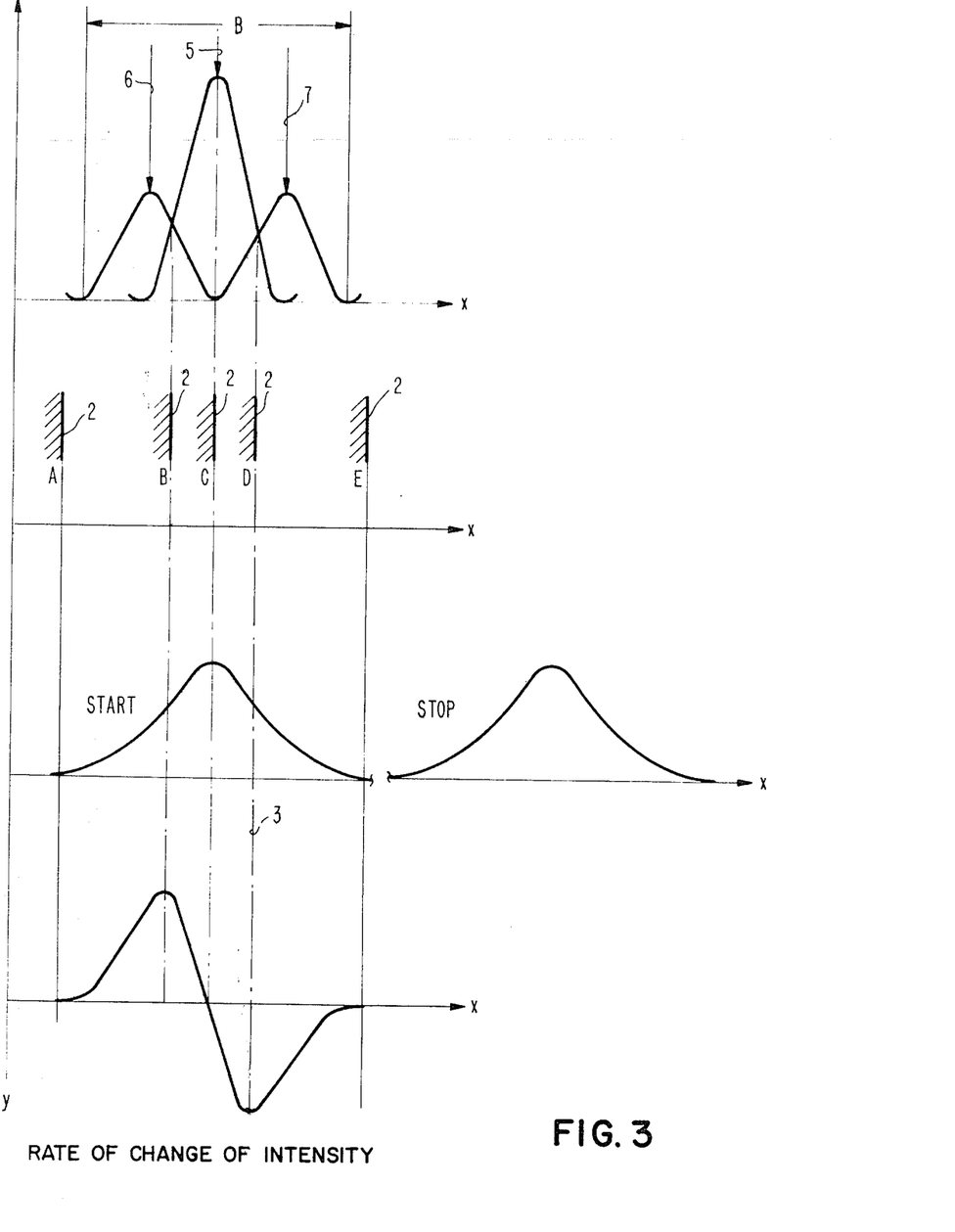
FIG. 3 is a drawing showing a signal curve obtained in accordance with the optical zero tuning system of this invention.

FIG. 2, the curve illustrates, in accordance with this invention, the brightness densities upon the alternate illumination of a plane with two configurations of light beams with the first configuration illustrated by light beam 5 having twice the brightness density of the illumination obtained by each of light beams 6 and 7 in the second configuration. The same alternate illumination is shown in the top portion of FIG. 3. Below the illumination curves in FIG. 3 is also illustrated five different edge positions of an edge 2 in five steps of progression A through E as the edge intersects light beams 5, 6 and 7 on passage therethrough. Immediately below, in FIG. 3, a curve is shown illustrating the change in light intensity as the edge 2 progresses through positions A through E. This is followed by another curve illustrating the shape of the signal generated by optical tuning upon passage of an edge through the alternate illumination by light beam 5 and with light beams 6 and 7.

This alternating configuration of light probes insures a zero crossing of the alternating light probes at the moment when the bright-dark edge 2, to be located, coincides with the symmetry line 3 of he light probes. In the lower-most portion of FIG. 3, the overall shape of the signal is described as a function of the edge position.

For purposes of explanation in conjunction with FIG. 3, it may be assumed that an edge 2 of an opaque surface is moving in a positive $x$ direction to intersect light beams 5, 6 and 7 in their two alternating configurations all sensed by a suitable detector, e.g. photo detector, to provide an indication in a change in intensity and/or rate of change of intensity. In the original position of edge 2 at A light beams 5, 6 and 7, in their alternating arrangements, are imaged on a transparent portion of the surface, or moving plane, to the detector. As will be recalled, the light beams 6 and 7 are imaged together in spaced relationship in one configuration with equal intensity, and light beam 5, in the alternate configuration, represents the combined or additive combination of light beam 6 and 7 so its intensity will be equal to the added intensities of light beam 6 and 7. Since the alternating intensities are equal, a detector will indicate no change in intensity of the two alternate configurations. As the edge 2 of an opaque area approaches position B, it continuously screens corresponding portions of light beam 6 from the detector, while leaving unaffected the total intensity of light beam 5 or the light intensity of 7. This increasing change in intensity (as it screens light beam 6) is shown in FIG. 3, as is also the rate of change in intensity. As the edge continues to move to position C (with light beam 6 screened out) the difference in intensities between the available illumination with light beams 6 and 7 and light beam 5 continues to increase until, at position C, only half the illumination of beam 5 is imaged in the one configuration and all of beam 7 allowed to image in the alternate configuration. Since half of the light intensity of light beam 5 is equal to the light intensity of light beam 7, the difference in illumination, sensed by detector, becomes zero and thus momentarily results in no change in intensity at position C. This minimum change in intensity is shown in FIG. 3 as well as the maximum rate of change of intensity at this minimum.

As the edge 2 continues to move to position D, it continues to screen out additional portions of light beam 5, resulting again in a change of intensity where the intensity of light beam 7 surpasses the decreasing intensity of light beam 5. In a subsequent movement of light edge 2 to position E, it continues to screen successive portions of light beam 7 so as to completely blank it out at its final point of travel. At position E, both light beam configurations (light beam 5 of one configuration and light beams 6 and 7 in the other configuration) are all screened out resulting in no difference in light intensity during alternating projections of the two light beam configurations.

As will be evident, the maximum value of the gradient of the rate of change of intensity in the zero vicinity crossing, depends solely on the sharpness of the imaging of the middle light beam probe 5. This gradient will normally remain slightly below optimum value when, in the interest of minimum overall single width, a very small spacing between light beam probes 6 and 7 is selected.

In this manner, strong overlapping of the individual components of the ight probe configurations as well as a consequent overall decrease of the maximum amplitude of the signal is obtained. A minimum signal width is desirable in those cases where line widths or line spacing are to be measured which are in the order of the edge signal width itself. The arrangement as shown in FIGS. 2 and 3 represent a compromise therebetween where the maximum of a double light beam probes 6 and 7 coincide with the first secondary minimum of the individual light probe 5. For example, if an objective of a numeric apperature N. A. = 0.6 is used and the light of a HeNe laser with $\lambda = 0.63$ microns is employed, the overall single width is represented by the formula $B = 2 \times 1.22\lambda/N.A.$ assuming an edge of ideal sharpness.

In FIGS. 4 to 9, various embodiments are shown for incorporating the foregoing as will be described below.

Figure 4:
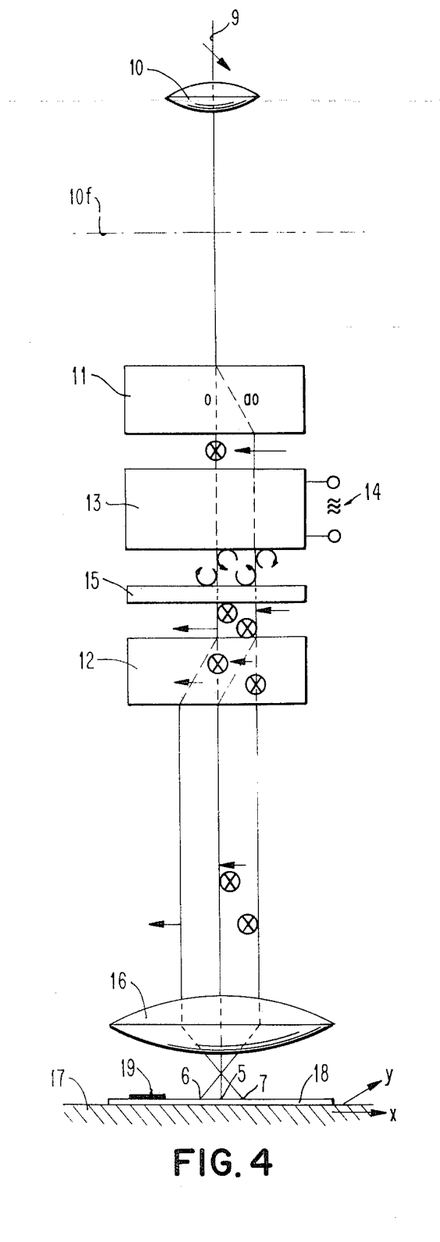
FIGS. 4 to 9 are drawings illustrating various embodiments of this invention.

In the embodiment shown in FIG. 4, the system includes a lens 10, birefringement crystals 11 and 12, an electroptic rotating element 13, a High Frequency voltage source 14, (typically of the order of 5 megahertz), a quarterwave plate 15, a lens 16, and a support 17, typically transparent, moveable in two directions X — Y perpendicularly to each other and vertically to the beam direction, a surface 18, (for example, transparent) to be analyzed with a line 19 (e.g. opaque) carried on the surface. Lens 10 with a focal plane 10f transmits a light beam 9 which is linearly polarized at 45° to the viewing plane, e.g. the drawing plane, by suitable means, such a source of linearly polarized light and a quarter-wave plate. The birefringement crystal 11, typically calcite, is cut and aligned in such a manner that it will transmit a portion of light beam 9 undeflected as an ordinary beam $o$, and a portion of light beam 9 in deflection at a predetermined angle as an extraordinary beam ao. An electro-optic arrangement 13 of a crystal showing the longitudinal electro-optic effect (e.g. of potassium dihydrogen phosphate crystal) is provided at its opposite surfaces with transparent electrodes. These electrodes are energized by means of a High Frequency alternating voltage source 14 (e.g. 5 megahertz) so as to rotate the ordinary and extraordinary beams, respectively $o$ and ao, between one-fourth $\lambda$ and three-fourths $\lambda$ increments. Any of the conventional rotators may be used as for example, those disclosed in U. S. Pat. Nos. 3,375,052 and 3,499,700. The electro-optic rotating element 13 is arranged in such a manner, with respect to the poloraziation planes of the ordinary and extraordinary beams leaving birefringement crystal 11, that these beams, upon energization of optical rotator 13, are split into two components which are polarized vertically with respect to each other with the mutual phase positions shifted against each other during the one halfwave of the High Frequency alternating source in one direction, and during the other half-wave in the other direction by one-fourth $\lambda$.

The consequence thereof is that the ordinary beams $o$ which leaves birefringement crystal 11 in a linearly polarized manner vertically to the drawing plane is changed, upon a positive half-wave of High Frequency alternating voltage 14 into a left-handed circularly polarized radiation, and during the negative half-wave of High Frequency alternating source 14 into a right-handed circularly polarized radiation.

The extraordinary beam ao leaving birefringement crystal 11 in a polarized manner parallel to the drawing plane is changed in the electro-optic rotator element 13 during the positive half-wave of High Frequency alternating voltage source 14 into a right-handed circularly polarized beam, and during the negative half-wave of High Frequency alternating voltage source 14 into a left-handed circularly polarized beam.

The system also includes a quarter-wave plate 15 which is cut and aligned in such a manner that the radiation leaving birefringement crystal 11 as an ordinary beam $o$, after passing it through electro-optic element 13, leaves the quarterwave plate 15 during a positive half-wave of High Frequency alternating voltage source 14, as a radiation which is vertically polarized to the drawing plane, and during a negative half-wave of High Frequency alternating voltage 14, as radiation which is polarized parallel to the drawing plane.

The light beam leaving birefringement crystal 11 as an extraordinary beam ao, leaves the quarter-wave plate 15, after having passed through the electro-optic rotator element 13, during a positive half-wave of High Frequency alternating voltage source 14, as irradiation which is polarized parallel to the drawing plane, and during a negative half-wave of High Frequency alternating voltage source 14 as irradiation which is polarized vertically to the drawing plane. As a result, the irradiation in birefringement crystal 11 as an ordinary beam $o$ is transmitted through birefringement crystal 12, during a positive half-wave of High Frequency alternating voltage source 14, undeflected as an ordinary beam, whereas the radiation leaving birefringement crystal 11 as an extraordinary beam ao is deflected in birefringement crystal 12 in such a manner that it joins or merges with the radiation leaving the birefringence crystal as an ordinary beam $o$ at a single exit site on the exit face of crystal 12. During the negative half-wave of the voltage supplied by the High Frequency alternating voltage source 14, the radiation leaving birefringement crystal 11 as an ordinary beam $o$, is deflected in birefringement crystal 12 as an extraordinary beam ao, whereas the radiation leaving crystal 11 as an extraordinary beam ao, penetrates the birefringement crystal 12, owing to the position of its polarization plane, undeflected as an ordinary beam at a different exit site on the exit face of crystal 12.

In operation, during a negative half-wave cycle of the voltage enerated by High Frequency source 14, lens 16 images on surface 18 two points of illumination which are symmetrical to an illumination point imaged during a positive half-wave cycle of source 14. Upon shifting of support 17 to the right, line 19 reaches the range of the light probes formed by combinations of light beams 5, 6 and 7 formed during the alternate configuration of the light beams exiting from crystal 12 at three different space points. The indication of edge finding takes place in the manner described in connection with the description of FIG. 3.

Figure 5:
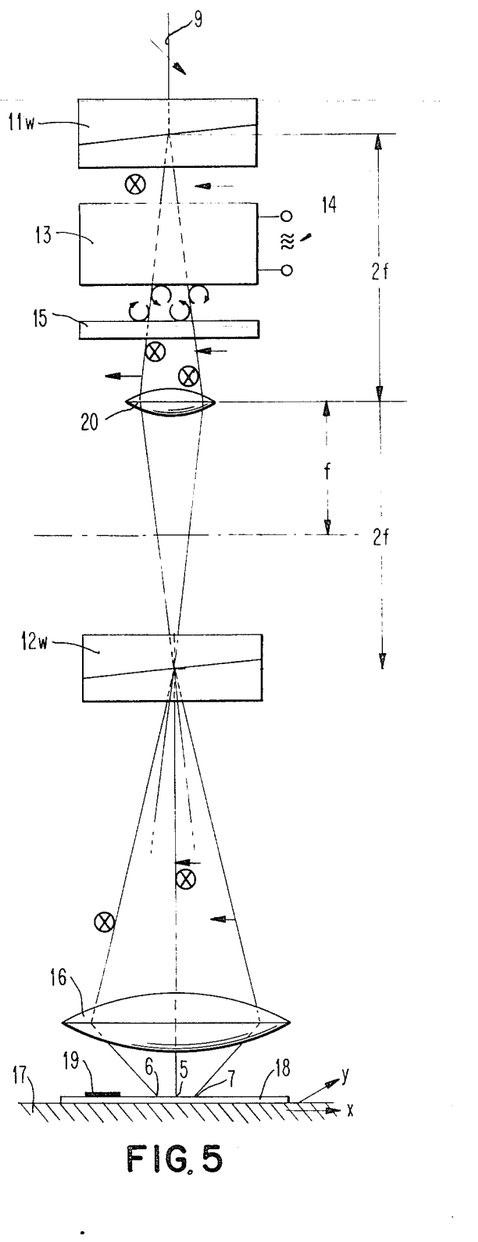

The embodiment showing in FIG. 5 is substantially of the same structure, with the exception of the fact that birefringement crystals 11 and 12 are replaced by Wollaston prisms 11w and 12w. The radiation represented by beam 9 and linearly polarized to the drawing plan at an angle of 45° is split in Wollaston prism 11w into one component which is polarized vertically to the drawing plane into a second component polarized in a plane parallel to the drawing plane. In theelectro-optic rotating element 13, which is of the same design as employed in system of FIG. 4, the two light beam components are split into extraordinary and ordinary beams. By the energization of the electro-optic rotating element 13, by means of a High Frequency alternating voltage source 14 generating a so-called quarter-wave voltage, the ordinary beams are shifted with respect to the extraordinary beams in a manner well-known in the art, if there is a positive half-wave of High Frequency alternating voltage source 14 by quarter-wave in one direction and conversely if there is a negative half-wave voltage at the same voltage source, by quarter-wave in the other direction with respect to each other. This has the consequence that the beam leaving the Wollaston prism 11w vertically polarized to the drawing plane leaves the electro-optic rotating element 13 in a left-handed circular polarized manner if there is a positive half-wave of High Frequency from alternating voltage source 14, whereas, the other beam leaves the electro-optic element 13 in a right-handed circular polarized manner. If there is a negative half-wave of High Frequency from alternating voltage source 14, the first beam leaves the electro-optic rotating element 13 in a right-handed circular polarization, whereas the other beam leaves this element in a left-hand circular polarization. Upon leaving the quarter-wave plate 15, the two beams, on a positive half-wave of High Frequency from alternating source 14 are polarized verticaly and in parallel to the drawing plane. Conversely, if there is a negative half-wave, they are polarized in parallel and vertical planes to the drawing plane. After passing through lens 20, the light beams reach a second Wollaston prism 12w and leave, according to the state of polarization, either as an individual beam coinciding with the optical axis, or as two laterally extending beams, so as to generate either a single beam probe 5 or as double beam probe 6 and 7 on surface 18.

Figures 6, 7:
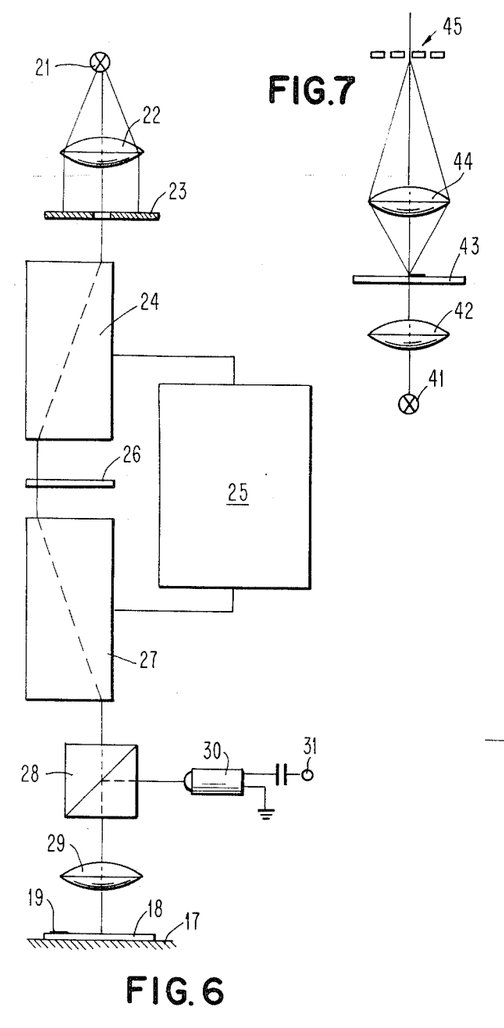

FIG. 6 shows a still further embodiment of the invention. In the system shown here, monochromatic radiation emanating from the light source 21 is transmitted by a collimator lens 22 and an aperture plate 23 to enter a first light deflector 24, which similarly to a second light deflector 27, is comprised of a plurality of deflector stages each containing an electro-optically controllable rotator and a birefringement crystal. An analogous arrangement of deflectors and rotators may be found in the aforeindicated U. S. Pat. No. 3,499,700.

Figure 6A:
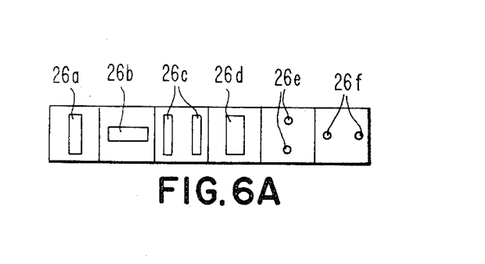

Following the ight deflector 24, a mask 26 is provided which as indicated in FIG. 6A, is comprised of an opaque layer with a series of transparent zones. Following mask 26, is a second light deflector 27, a beam splitter 28, a lens 29 and a support 17, which can be shifted in two directions vertically to each other, as well as vertically to the beam direction, and which carries a surface 18 and a line 19 to be analyzed. The two light deflectors 24 and 27 are operated by a conventional electronic control arrangement 25 in such a manner that the beam leaving the first light deflector penetrates one respective zone of mask 26, and then the beam carrying the information is further deflected by the second light deflector 27 in a complementary manner so that it enters beam splitter 28 at a same spot each time.

By suitable programming the electronic control 25, the beams leaving the first beam deflector 24 can, for example, be directed alternately to fields 26c and 26d of mask 26, so that on surface 18 one respective single gap and a double gap of the same overall surface is oscillated symmetrically in an alternate manner. The light reflected at surface 18 or line 19, respectively, is retransmitted through lens 29 a second time and is a partly projected by beam splitter 28 in the direction of the light detector 30. If the edge of line 19 gets into the symmetry line of the light beam probe configurations, periodically imaged on surface 18, the voltage at output 31 of photodetector 30 will equal zero for indicating the disappearance of the second derivitive.

Figure 8:
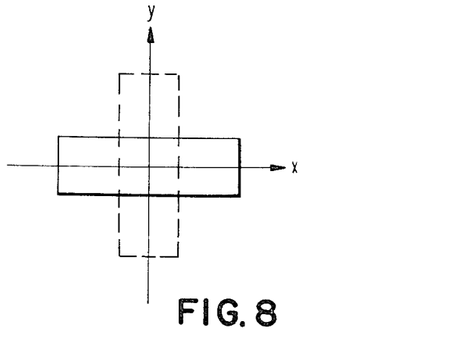
Figure 9:
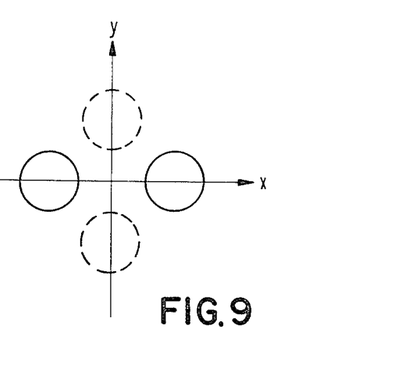

If the electronic control 25 is programmed in such a manner that the fields 26a and 26b of mask 26 are alternately selected by the beam probe, the image of a horizontal and of a vertical rectangle is alternately oscillated in imaging on surface 18 as shown in FIG. 8. If a scanned edge reaches the symmetry line of the light beam configurations, the signal appearing at output 31 of light detector 30 disappears also. It is equally possible to perform the scanning by means of a spot arrangement as shown in FIG. 9. With such an arrangement, it is possible to determine the symmetry position with respect to edges extending in two directions which are perpendicular to each other. For generating the spot arrangement, the electronic control 25 of the embodiment shown in FIG. 6 may be programmed in such a manner that fields 26e, 26f are alternately selected by the beam probe. It is to be understood that other spot and gap patterns are equally possible, as, for example, the individual gaps can show different lengths, different intensities and different symmetry positions with respect to each other. This applies equally to the spot arrangement as referred to in FIG. 9. The light reflected at surface 18 can be evaluated by means of any conventional circuitry. It is, of course, equally possible to perform the evaluation with different transparencies of surface 18. In FIGS. 4 and 5, the beam splitters and light detectors necessary for automatic evaluation have been omitted so as to render the representation less complicated.

Figure 7A:
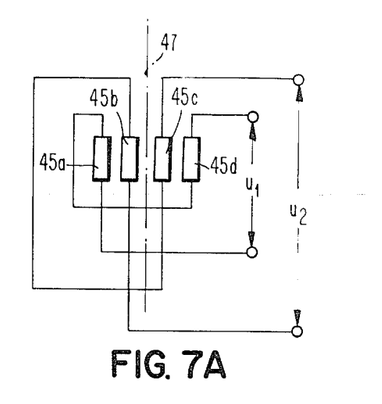
Figure 7B:
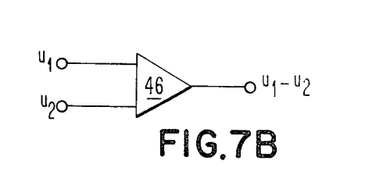

FIG. 7 shows a further embodiment of the invention which includes a light source 41, a condenser 42, a semiconductor mask 43 to be measured, a microscopic objective 44, and a photodetector arrangement 45. The photo-detector arrangement 45 is illustrated in FIG. 7A wherein it is shown to include four detectors 45a, 45b, 45c and 45d. The terminals marked U1 and U2 are connected to the inputs of a differential amplifier 46 (FIG. 7B) from which the output signal will equal zero when the edge of the line drawn on mask 43 reaches a symmetry line 47 of the detector arrangement 45 Unlike previous embodiments, this embodiment differs to the dynamic processes of the first three embodiments by being a static application.

While the invention has been particularly shown and described with reference to preferred embodiments thereof, it will be understood by those skilled in the art that the foregoing and other changes in former details may be made therein without departing from the spirit and scope of the invention.

What is claimed is:

1. A light beam deflection system comprising:
    A. means for producing a beam of plane polarized light;
    B. means for rotating the plane of polarization of said beam to two intermediate coexisting mutually orthogonal planes of polarization;
    C. first birefringent means for passing said rotated beam therethrough in a first configuration of two polarized beams having a respective one of two spaced perpendicular polarized planes, along a corresponding one of two different paths;
    D. electro-optic control means alternately settable between
        a. a first state maintaining said first configuration of perpendicular planes of polarized beams, and
        b. a second state for circular polarization thereof in their respective beam paths;
    E. means for linearly polarizing the circularly polarized beams in two respective mutually orthogonal in phase beam planes; and
    F. second birefringent means having parallel entrance and exit faces for passage therethrough of said beam paths with said beam paths
        a. in said first configuration having a first of said beam paths with one plane of polarization of said beam paths passing in an undeflected path and the other of said beam path having a perpendicular plane of polarization deflected into convergence with said first beam path at a first exit site on the exit face of said second birefringent means, and b. in said second rotated configuration having the said second beam path with the rotated plane of polarization passing in an undeflected path to a second exit site on said exit face spaced from said first exit site on one side thereof, and the said first beam path with its rotated and perpendicular plane of polarization deflected in divergence from said first beam path at a third exit site on said exit face spaced from said second exit site and from said first exit site on the opposite side thereof.

2. The system of claim 1 wherein said spaced second and third exit sites are symmetrically spaced on opposite sides of said first exit site.

3. The system of claim 1 wherein said control means comprises means for oscillation between said first and second states.

4. The system of claim 1 wherein said control means comprises means for High Frequency oscillation between said first and second states.

5. The system of claim 1 wherein the first said rotating means rotates the beam 45° intermediate said two mutually orthogonal planes of polarization.

6. The system of claim 1 including
A. sensing means in register with said first, second and third exit beams for detecting the intensities thereof, and
B. means for passing an edge of different optical properties on a plane parallel to said exit face and intersecting said first, second and third exit beams.

7. The system of claim 6 wherein said sensing means comprises detection of the maximum change in intensities of said first, second and third exit beams as said edge passes therethrough.

8. The system of claim 2 wherein said control means comprises means for oscillation between said first and second states.

9. The system of claim 8 wherein the first said rotating means rotates the beam 45° intermediate said two mutualy orthogonal planes of polarization.

10. The system of claim 9 including
A. sensing means in register with said first, second and third exit beams for detecting the intensities thereof, and
B. means for passing an edge of different optical properties on a plane parallel to said exit face and intersecting said first, second and third exit beams.

11. The system of claim 10 wherein said sensing means comprises detecting of the maximum change in intensities of said first, second and third exit beams as said edge passes therethrough.

12. The system of claim 8 including
A. sensing means in register with said first, second and third exit beams for detecting the intensities thereof, and
B. means for passing an edge of different optical properties on a plane parallel to said exit face and intersecting said first, second and third exit beams.

13. The system of claim 12 wherein said sensing means comprises detection of the maximum change in intensities of said first, second and third exit beams as said edge passes therethrough.

14. The system of claim 2 wherein the first said rotating means rotates the beam 45° intermediate said two mutually orthogonal planes of polarization.

15. The system of claim 14 including
A. sensing means in register with said first, second and third exit beams for detecting the intensities thereof, and
B. means for passing an edge of different optical properties on a plane parallel to said exit face and intersecting said first, second and third exit beams.

16. The system of claim 15 wherein said sensing means comprises detection of the maximum change in intensities of said first, second and third exit beams as said edge passes therethrough.

17. The system of claim 2 including
A. sensing means in register with said first, second and third exit beams for detecting the intensities thereof, and
B. means for passing an edge of different optical properties on a plane parallel to said exit face and intersecting said first, second and third exit beams.

18. The system of claim 17 wherein said sensing means comprises detection of the maximum change in intensities of said first, second and third exit beams as said edge passes therethrough.

19. The system of claim 2 wherein said control means comprises means for High Frequency oscillation between said first and second states.

20. The system of claim 19 wherein the first said rotating means rotates the beam 45° intermediate said two mutually orthogonal planes of polarization.

21. The system of claim 20 including
A. sensing means in register with said first, second and third exit beams for detecting the intensities thereof, and
B. means for passing an edge of different optical properties on a plane parallel to said exit face and intersecting said first, second and third exit beams.

22. The system of claim 21 wherein said sensing means comprises detection of the maximum change in intensities of said first, second and third exit beams as said edge passes therethrough.

23. The system of claim 19 including
A. sensing means in register with said first, second and third exit beams for detecting the intensities thereof, and
B. means for passing an edge of different optical properties on a plane parallel to said exit face and intersecting said first, second and third exit beams.

24. The system of claim 23 wherein said sensing means comprises detection of the maximum change in intensities of said first, second and third exit beams as said edge passes therethrough.

25. The system of claim 3 wherein the first said rotating means rotates the beam 45 degrees intermediate said two mutually orthogonal planes of polarization.

26. The system of claim 25 including
A. sensing means in register with said first, second and third exit beams for detecting the intensities thereof, and
B. means for passing an edge of different optical properties on a plane parallel to said exit face and intersecting said first, second and third exit beams.

27. The system of claim 26 wherein said sensing means comprises detection of the maximum change in intensities of said first, second and third exit beams as said edge passes therethrough.

28. The system of claim 3 including
A. sensing means in register with said first, second and third exit beams for detecting the intensities thereof, and
B. means for passing an edge of different optical properties on a plane parallel to said exit face and intersecting said first, second and third exit beams.

29. The system of claim 28 wherein said sensing means comprises detection of the maximum change in intensities of said first, second and third exit beams as said edge passes therethrough.

30. The system of claim 4 wherein the first said rotating means rotates the beam 45° intermediate said two mutually orthogonal planes of polarization.

31. The system of claim 30 including
A. sensing means in register with said first, second and third exit beams for detecting the intensities thereof, and
B. means for passing an edge of different optical properties on a plane parallel to said exit face and intersecting said first, second and third exit beams.

32. The system of claim 31 wherein said sensing means comprises detection of the maximum change in intensities of said first, second and third exit beams as said edge passes therethrough.

33. The system of claim 4 including
A. sensing means in register with said first, second and third exit beams for detecting the intensities thereof, and
B. means for passing an edge of different optical properties on a plane parallel to said exit face and intersecting said first, second and third exit beams.

34. The system of claim 33 wherein said sensing means comprises detection of the maximum change in intensities of said first, second and third exit beams as said edge passes therethrough.

35. The system of claim 5 including
A. sensing means in register with said first, second and third exit beams for detecting the intensities thereof, and
B. means for passing an edge of different optical properties on a plane parallel to said exit face and intersecting said first, second and third exit beams.

36. The system of claim 35 wherein said sensing means comprises detection of the maximum change in intensities of said first, second and third exit beams as said edge passes therethrough.

* * * * *